United States Patent
Watanabe

(10) Patent No.: US 9,797,724 B2
(45) Date of Patent: Oct. 24, 2017

(54) CAPSIZE RISK LEVEL CALCULATION SYSTEM

(71) Applicant: NAT'L UNIV. CORP. TOKYO UNIV. OF MARINE SCIENCE AND TECH., Tokyo (JP)

(72) Inventor: Yutaka Watanabe, Tokyo (JP)

(73) Assignee: NATIONAL UNIVERSITY CORPORATION TOKYO UNIVERSITY OF MARINE SCIENCE AND TECHNOLOGY, Tokyo (JP)

( * ) Notice: Subject to any disclaimer, the term of this patent is extended or adjusted under 35 U.S.C. 154(b) by 385 days.

(21) Appl. No.: 14/401,471

(22) PCT Filed: May 16, 2013

(86) PCT No.: PCT/JP2013/063647
§ 371 (c)(1),
(2) Date: Nov. 14, 2014

(87) PCT Pub. No.: WO2013/172408
PCT Pub. Date: Nov. 21, 2013

(65) Prior Publication Data
US 2015/0134293 A1    May 14, 2015

(30) Foreign Application Priority Data
May 17, 2012 (JP) .................... 2012-113008

(51) Int. Cl.
*B63B 3/00* (2006.01)
*G01C 21/00* (2006.01)
(Continued)

(52) U.S. Cl.
CPC ............ *G01C 21/00* (2013.01); *B63B 39/14* (2013.01); *G01B 21/00* (2013.01)

(58) Field of Classification Search
CPC ............................. B63B 39/06; A63B 22/16
(Continued)

(56) References Cited

U.S. PATENT DOCUMENTS 4,549,267 A * 10/1985 Drabouski, Jr. ........ B63B 39/03
114/124
2003/0182041 A1 * 9/2003 Watson ............... B60R 21/0132
701/45

FOREIGN PATENT DOCUMENTS

EP    2 377 755 A2    10/2011
JP    49-16198    2/1974
(Continued)

*Primary Examiner* — Lam Nguyen
(74) *Attorney, Agent, or Firm* — Birch, Stewart, Kolasch & Birch, LLP

(57) ABSTRACT

Provided is a capsize risk level calculation system which can calculate a capsize risk level providing an index of the capsize risk on an oscillation of hull without using hull information. This system includes an acceleration sensor detecting a reciprocating motion in an up-down direction of a vessel as an oscillation in an up-down direction of a virtual oscillation center axis; an angular velocity sensor detecting a simple pendulum motion in a rolling direction around the vessel center axis as a simple pendulum motion of the vessel COG around the oscillation center axis; and an arithmetic part calculating a capsize risk level from an oscillation radius connecting between the oscillation center axis and the vessel COG, and a capsize limit oscillation radius connecting between the oscillation center axis and the vessel metacenter, which are obtained on the results of detection by the acceleration sensor and the angular velocity sensor.

3 Claims, 14 Drawing Sheets

(51) Int. Cl.
*B63B 39/14* (2006.01)
*G01B 21/00* (2006.01)

(58) Field of Classification Search
USPC .............................. 701/124, 45, 70; 114/124
See application file for complete search history.

(56) References Cited

FOREIGN PATENT DOCUMENTS

| | | |
|---|---|---|
| JP | 01-109194 A | 4/1989 |
| JP | 04-087894 A | 3/1992 |
| JP | 63-038094 A | 2/1998 |
| JP | 11-79076 A | 3/1999 |
| JP | 2008-260315 A | 10/2008 |
| JP | 2011-219081 A | 11/2011 |
| JP | 2012-091690 A | 5/2012 |

\* cited by examiner

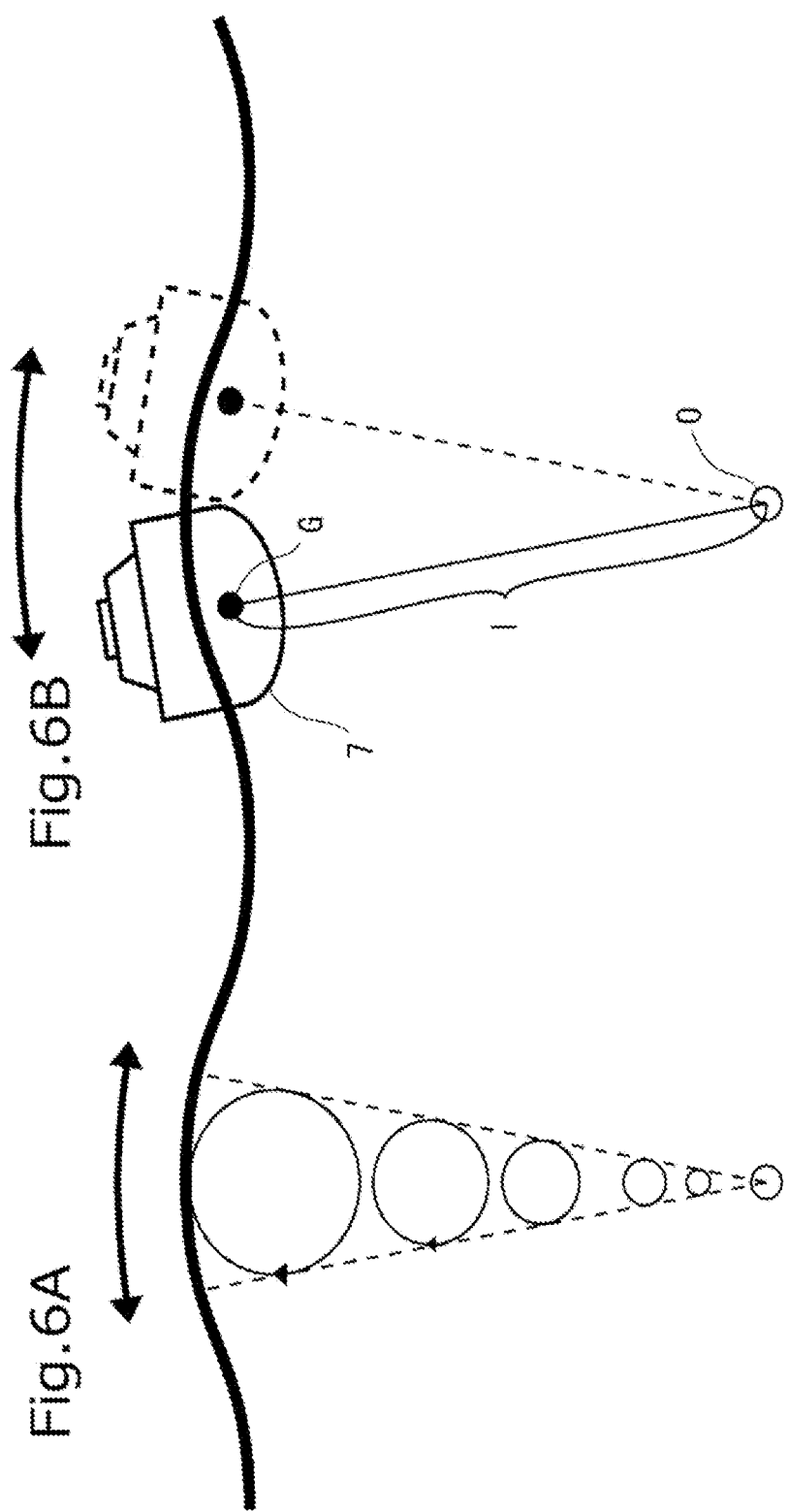

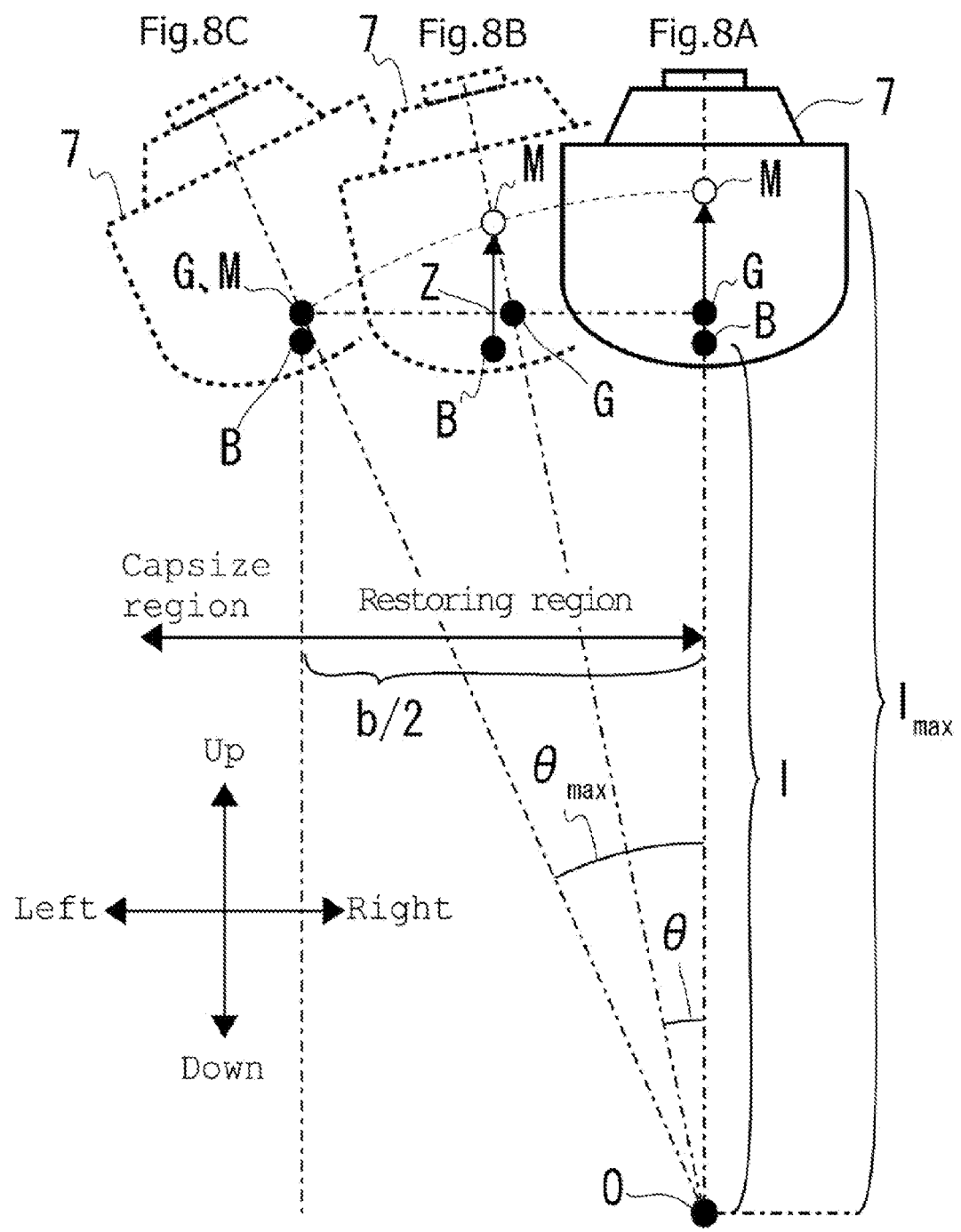

| | GM (m) | ν (Hz) | ν' (Hz) | l (m) | l_max (m) | cos θ_max (l/l_max) | θ_max (degree) | l_max−l (GM) (m) | b (m) | h (m) | θ_h (degree) | θ_max−θ_h (degree) |
|---|---|---|---|---|---|---|---|---|---|---|---|---|
| Vessel A | 1.75 | 0.244 | 0.293 | 2.741 | 4.545 | 0.603 | 52.9 | 1.80 | 7.3 | 9.6 | 52.9 | −0.0 |
| Vessel B | 1.36 | 0.146 | 0.341 | 3.762 | 4.979 | 0.756 | 40.9 | 1.22 | 6.5 | 5.7 | 41.1 | −0.2 |

Fig.10

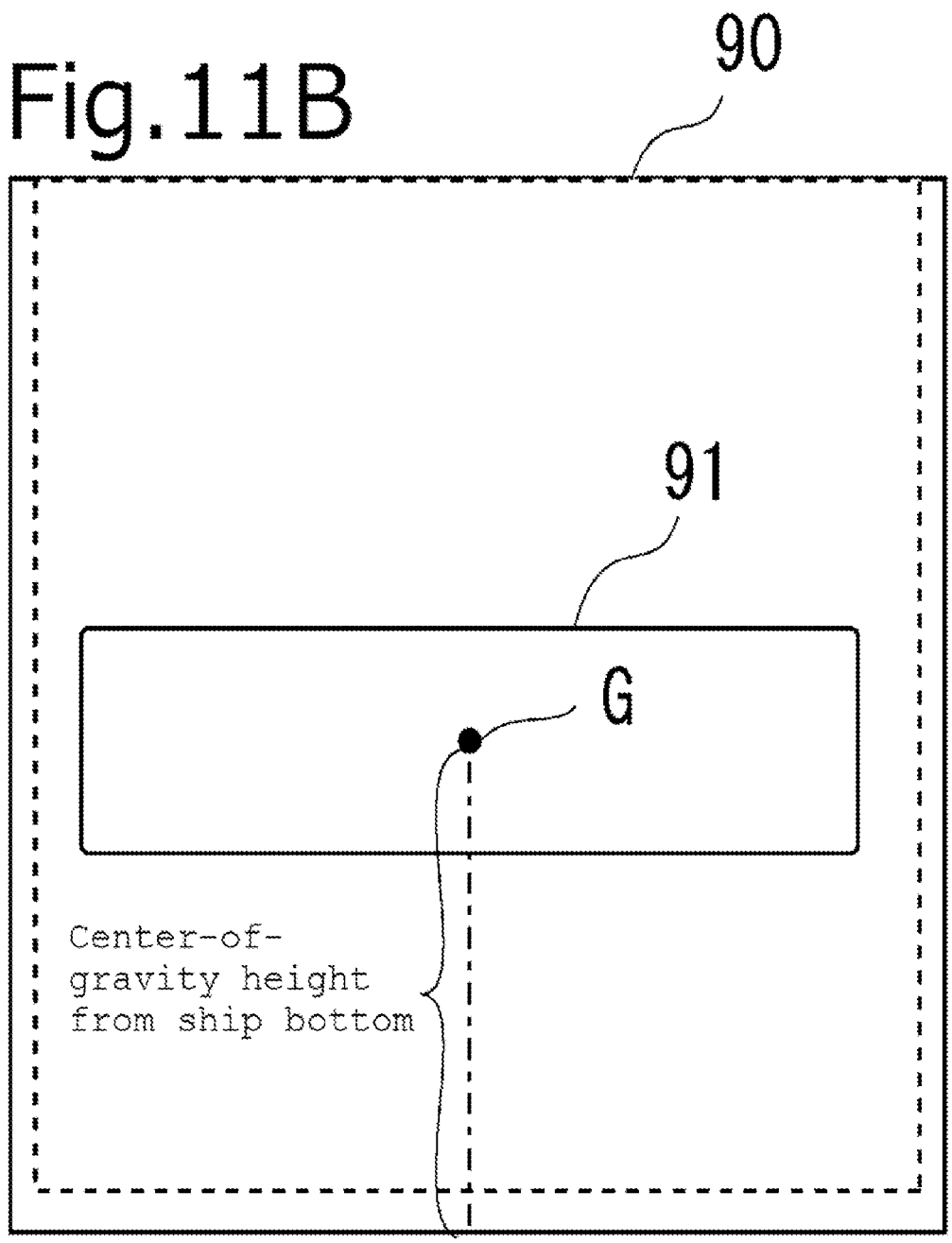

| COG h. from ship bottom (m) | $v$ (Hz) | $v'$ (Hz) | $l$ (m) | $l_{max}$ (m) | $\cos\theta_{max}$ ($l/l_{max}$) | $\theta_{max}$ (degree) | $l_{max}-l$ (GM) (m) | b (m) | h (m) | $\theta_h$ (degree) | $\theta_{max}-\theta_h$ (degree) |
|---|---|---|---|---|---|---|---|---|---|---|---|
| 0.018 | 0.415 | 1.074 | 0.418 | 0.539 | 0.776 | 39.1 | 0.12 | 0.68 | 0.60 | 37.9 | 1.2 |
| 0.022 | 0.415 | 1.025 | 0.439 | 0.573 | 0.766 | 40.0 | 0.13 | 0.74 | 0.60 | 37.9 | 2.1 |
| 0.032 | 0.366 | 1.025 | 0.495 | 0.627 | 0.789 | 37.9 | 0.13 | 0.77 | 0.60 | 37.9 | -0.0 |
| 0.036 | 0.293 | 1.025 | 0.612 | 0.741 | 0.825 | 34.4 | 0.13 | 0.84 | 0.60 | 37.9 | -3.5 |
| 0.039 | 0.244 | 0.977 | 0.767 | 0.908 | 0.845 | 32.4 | 0.14 | 0.97 | 0.60 | 37.9 | -5.5 |
| 0.043 | | | | | | Capsized | | | | | |
| 0.046 | | | | | | | | | | | |

Fig.12

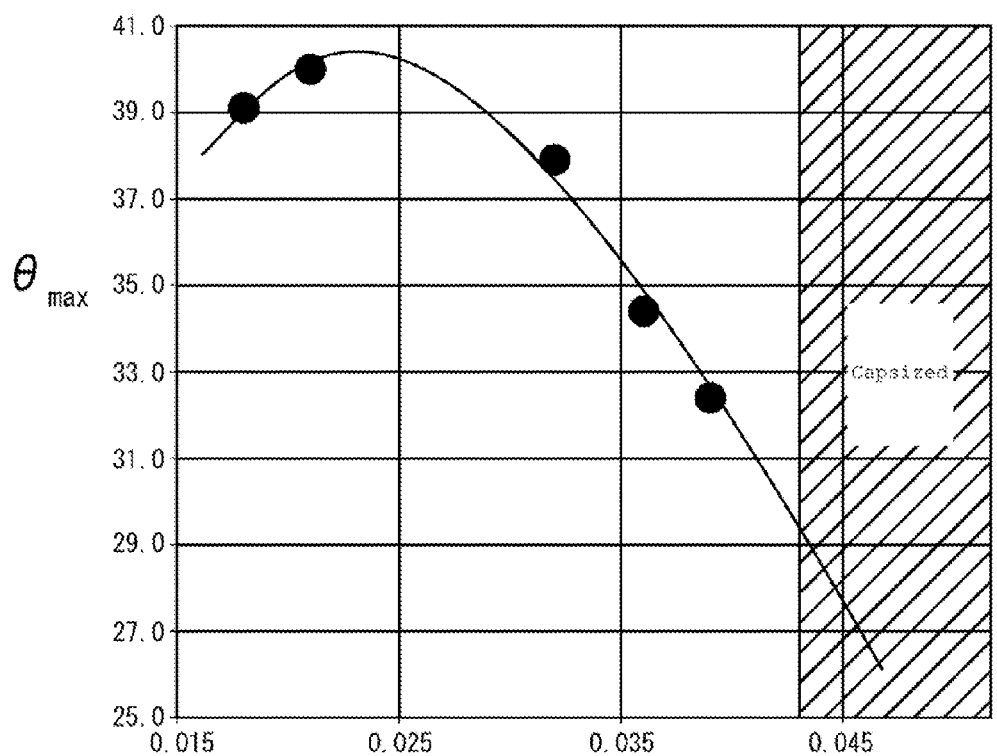
Fig.13 Center-of-gravity height from ship bottom

CAPSIZE RISK LEVEL CALCULATION SYSTEM

TECHNICAL FIELD

The present invention relates to a capsize risk level calculation system for calculating a capsize risk level providing an index of the risk of capsizing of a vessel.

BACKGROUND ART

In order to prevent a vessel from capsizing, there has been proposed a technique for reporting the risk of capsizing (for example, refer to Patent Document 1). With the invention disclosed in Patent Document 1, the risk of capsizing is determined by displaying limit value information about the possibility of capsizing that has been obtained on the basis of the hull motion data during navigation and the restoring performance information in the design phase. About the restoring performance information in the design phase, there is no specific description, however, in consideration of the existing naval architecture, it can be supposed to be hull information about the value of ship width, the center-of-gravity location, the buoyancy center location and the metacenter location which are in accordance with the inclination of the hull, and the like.

CITATION LIST

Patent Literature

Patent Document 1: Japanese Patent Application Laid-open No. 2008-260315

DISCLOSURE OF THE INVENTION

Problems to be Solved by the Invention

However, with the conventional technique, there has been a problem that, in the case where the hull information is not clear or exact, the hull motion data during navigation alone will not allow to obtain a piece of information providing an index of the risk of capsizing.

Most of the vessel capsizing accidents have been caused by small- and medium-sized vessels, such as fishing boats and recreational fishing boats. With such vessels, after having been purchased, a piece of fishing equipment and a variety of devices and instruments to be used for the purpose of taste are installed in the hull by a fisherman or the vessel owner, and therefore, the hull information at the time when the vessel has been delivered from the shipyard immediately following the construction often deviates from the hull information after the vessel having been actually put in service. Being based on such a current situation, these vessels are exempted from any requirement for including data for stability of the hull as a piece of hull information by the law (Ordinance for Enforcement of the Vessel Safety Act).

In addition, even with large-sized vessels which are required by the above-mentioned law to completely provide data for stability of the hull as a piece of hull information, the hull information greatly varies in accordance with the peripheral environment of the vessel (the wind intensity and wave height, the density of the seawater, and the like), or the conditions of the vessel (the cargoes, the amount of residual fuel, and the like), and thus it is difficult to grasp an exact piece of hull information in advance. Further, with such vessels as those which have been repeatedly subjected to reselling, there exist cases where no hull information has been left over.

In view of the above problem, the present invention has been made in order to solve the problem of the prior art, and it is an object of the present invention to provide a capsize risk level calculation system which is capable of calculating a capsize risk level providing an index of the risk of capsizing on the basis of an oscillation of the hull with no need for using the hull information.

Means for Solving the Problem

The capsize risk level calculation system in accordance with the present invention provides a capsize risk level calculation system including an up-down direction detection means for detecting a reciprocating motion in an up-down direction of a vessel as an oscillation in an up-down direction of a virtual oscillation center axis; a rolling direction detection means for detecting a simple pendulum motion in a rolling direction around the center axis of the vessel as a simple pendulum motion of the center of gravity of the vessel around the oscillation center axis; and a calculation means for calculating a capsize risk level from an oscillation radius connecting between the oscillation center axis and the center of gravity of the vessel, and a capsize limit oscillation radius connecting between the oscillation center axis and the metacenter of the vessel, which are obtained on the basis of the results of detection by the up-down direction detection means and the rolling direction detection means. Further, in the capsize risk level calculation system, the calculation means may be configured such that the calculation means calculates a capsize limit inclination angle on the basis of the oscillation radius and the capsize limit oscillation radius as a capsize risk level.

Advantages of the Invention

In accordance with the present invention, there is provided an advantage that, on the basis of a reciprocating motion in an up-down direction of a vessel, and a simple pendulum motion in a rolling direction around the center axis of the vessel, a capsize risk level, which provides an index of the risk of capsizing, can be calculated with no use of a piece of hull information.

BRIEF DESCRIPTION OF THE DRAWINGS

FIGS. 6(a) and 6(b) are an explanatory drawing for explaining the oscillation center axis of a vessel floating on the surface of the water;

FIGS. 8(a), 8(b), and 8(c) are a drawing illustrating the relationship among the metacenter M, the center of gravity G, the buoyancy center B, the oscillation center axis O, and the separation GZ in the event where the vessel is led to a great inclination;

FIG. 10 is a drawing illustrating an example of capsize risk level calculation by the embodiment of the capsize risk level calculation system in accordance with the present invention;

FIGS. 11(a) and 11(b) are a drawing illustrating a model ship which has been provided as an object of calculating a capsize risk level by the embodiment of the capsize risk level calculation system in accordance with the present invention;

FIG. 12 is a drawing illustrating an example of capsize risk level calculation using the model ship shown in FIG. 11 as the object; and FIG. 13 is a scatter diagram illustrating the relationship between the angle "$\theta_{max}$" shown in FIG. 12 and the center-of-gravity height.

BEST MODE FOR CARRYING OUT THE INVENTION

Next, an embodiment of the present invention will be specifically explained with reference to the drawings.

Figure 1:
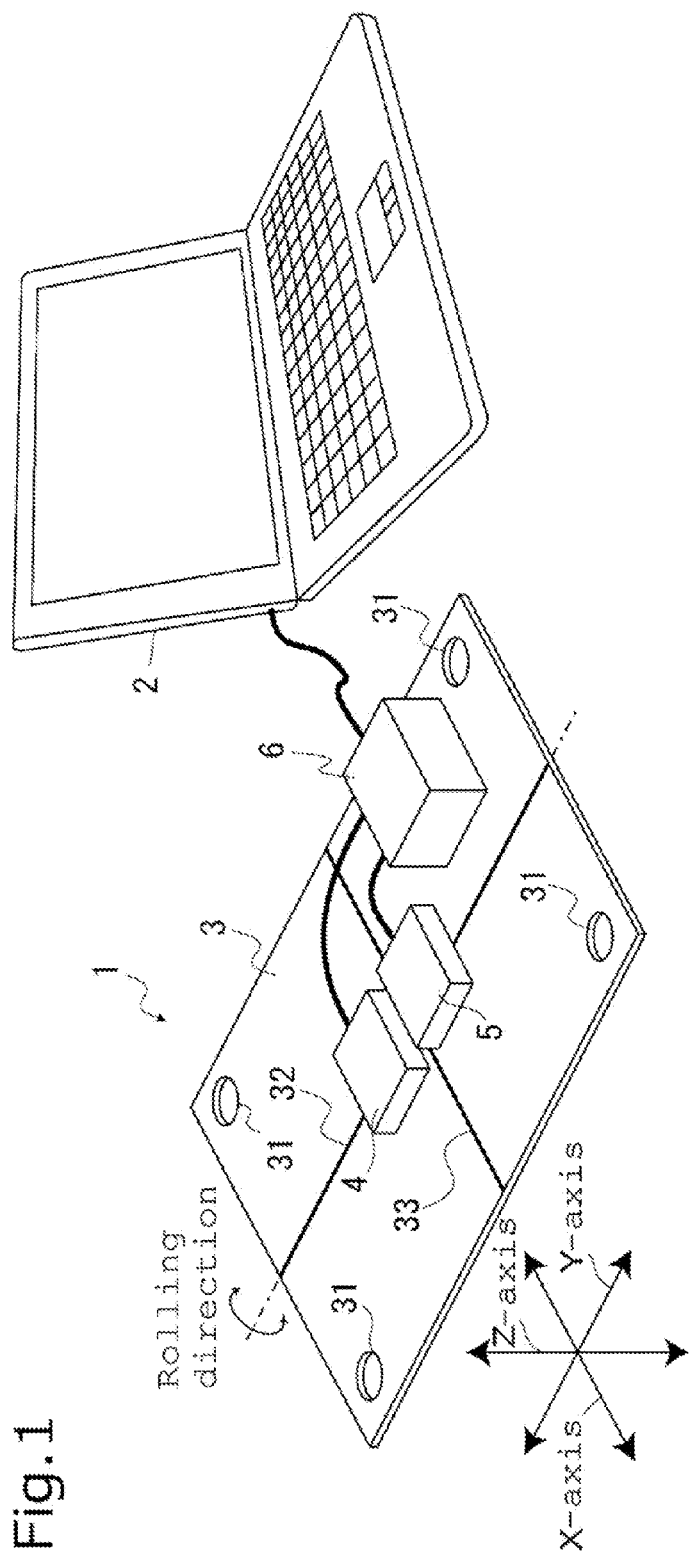
FIG. 1 is a schematic perspective view illustrating the configuration of an embodiment of a capsize risk level calculation system in accordance with the present invention.

Referring to FIG. 1, a capsize risk level calculation system of the present embodiment includes an oscillation detection part 1 which is to be mounted on a vessel for detecting an oscillation of the vessel, and a data processing apparatus 2 for calculating a capsize risk level on the basis of an oscillation of the vessel that has been detected by the oscillation detection part 1.

The oscillation detection part 1 is comprised of a reference board 3; an acceleration sensor 4 and an angular velocity sensor 5 which function as an oscillation detection means for detecting an oscillation of the reference board 3; and an A-D (analog-to-digital) converter 6.

The reference board 3 is a rectangular flat plate at the four corners of which a mounting hole 31 is formed, and on which a Y-axis line 32, and an X-axis line 33 orthogonal to the Y-axis line 32 are inscribed. With the acceleration sensor 4, the sensitivity axis is adjusted such that the acceleration in the Z-axis direction orthogonal to the Y-axis line 32 and the X-axis line 33, i.e., a vertical oscillation of the reference board 3 in an up-down direction is detected. In addition, with the angular velocity sensor 5, the sensitivity axis is adjusted such that the angular velocity in a direction of rotation around the Y-axis line 32, i.e., a horizontal oscillation of the reference board 3 in a rolling direction around the Y-axis line 32 is detected. The acceleration sensor 4 and the angular velocity sensor 5 are not particularly limited, and as the acceleration sensor 4, any type of sensor, such as a semiconductor type one or an electrostatic capacitance type one, can be adopted, while, as the angular velocity sensor 5, any type of sensor, such as a gyroscopic one or an optical fiber gyroscopic one, may be adopted. In addition, as the acceleration sensor 4 and the angular velocity sensor 5, a three-axis (3-D) angular velocity sensor may be used.

In addition, in the reference board 3, an A-D (analog-to-digital) converter 6 is provided. The A-D converter 6 converts analog signals (detection results) outputted from the acceleration sensor 4 and the angular velocity sensor 5 into digital signals to output them to the data processing apparatus 2.

Figure 2:
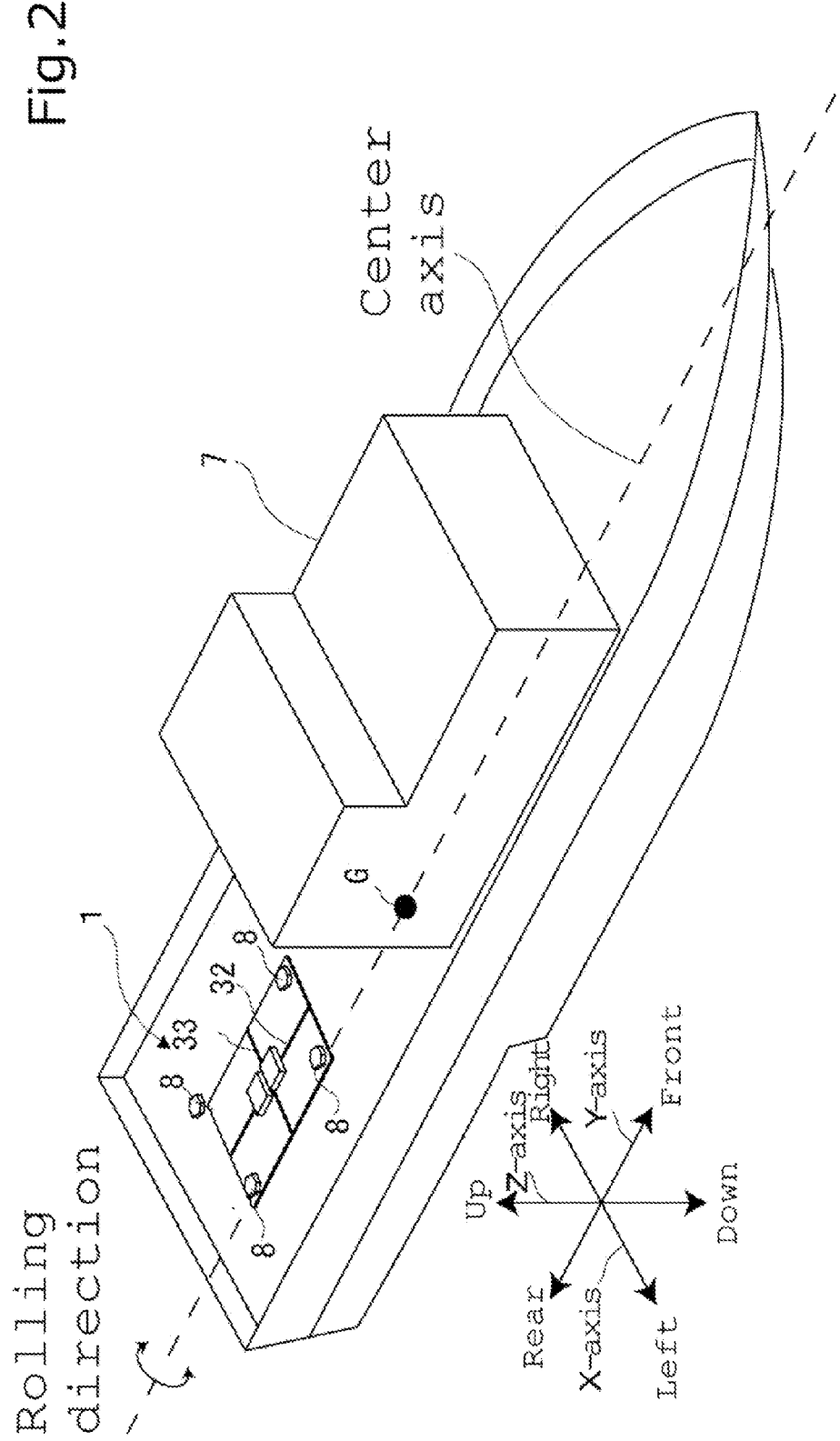
FIG. 2 is a schematic perspective view illustrating an example of mounting an oscillation detection part shown in FIG. 1 to a vessel.

Referring to FIG. 2, the oscillation detection part 1 is mounted to the vessel 7 with reference to the center line of the vessel 7. The center line of the vessel 7 is a virtual axis along the longitudinal direction of the hull on which the center of gravity G of the vessel 7 is located. The reference board 3 is mounted to the vessel 7 such that the Y-axis line 32 is in parallel with the center axis of the vessel 7, and the Z-axis perpendicular to the Y-axis line 32 and the X-axis line 33 intersects the center axis of the vessel 7. Thereby, the acceleration sensor 4 is adjusted for its sensitivity axis so as to detect a vertical oscillation in an up-down direction of the vessel 7, functioning as an up-down direction detection means for detecting a reciprocating motion in an up-down direction of the vessel 7. In addition, the angular velocity sensor 5 is adjusted for its sensitivity axis so as to detect a horizontal oscillation in a rolling direction around the center axis of the vessel 7, functioning as a rolling direction detection means for detecting a simple pendulum motion in a rolling direction around the center axis of the vessel. In order to cause the acceleration sensor 4 to accurately function as the vertical oscillation detection means, ideally it is desirable that the Y-axis line 32 is coincided with the center axis of the vessel 7, however, as shown in FIG. 2, if the reference board 3 is mounted in a place where the Y-axis line 32 is deviated from the center axis of the vessel 7 in an up-down direction (for example, on the deck, or the like), a vertical oscillation in an up-down direction of the vessel 7 can be detected substantially accurately. In FIG. 2, as one example of method of mounting the reference board 3 to the vessel 7, a scheme in which the mounting holes 31 are fastened with bolts 8 is given, however, provided that the oscillation detection part 1, in other words, the reference board 3 is oscillated integrally with the vessel 7, the method of mounting the reference board 3 to the vessel 7 is not limited, and any mounting method using means other than bolts (using a magnetic force, a sucker, or the like) may be adopted. Further, provided that the reference board 3 will not be slid with the vessel being oscillated, it may be simply placed on the deck, or appropriately installed in the cabin or the pilothouse. Further, the acceleration sensor 4 and the angular velocity sensor 5 may be directly mounted to the vessel 7 with no use of the reference board 3.

Figure 3:
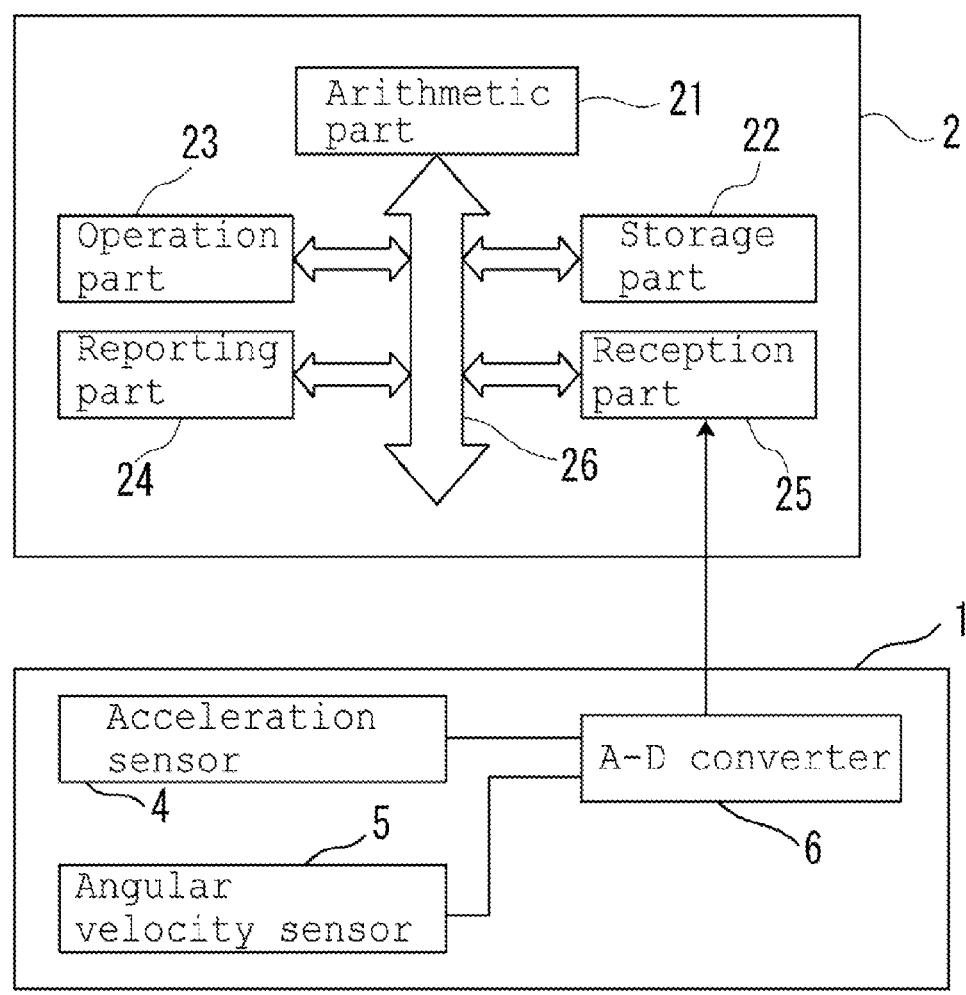
FIG. 3 is a block diagram illustrating the configuration of the embodiment of the capsize risk level calculation system in accordance with the present invention.

Referring to FIG. 3, the data processing apparatus 2 includes an arithmetic part 21 comprised of a microprocessor, and the like; a storage part 22 comprised of an ROM (read-only memory), an RAM (random access memory), and the like; an operation part 23, such as a keyboard; a reporting part 24, such as a liquid crystal display or a speaker; and a reception part 25, the respective parts being connected by a bus 26.

In the storage part 22, a calculation program for deriving the center-of-gravity location, and various constants to be inputted that are required for the calculation in question are stored. The arithmetic part 21 stores the outputs from the acceleration sensor 4 and the angular velocity sensor 5 in the storage part 22 for a certain period of time on the basis of an operation instruction from the operation part 23. Next, according to the calculation program stored in the storage part 22, the arithmetic part 21 calculates a capsize risk level for the vessel 7 that is based on an oscillation of the vessel 7, on the basis of the outputs from the acceleration sensor 4 and the angular velocity sensor 5 stored in the storage part 32. Then, the capsize risk level which has been calculated by the arithmetic part 21 is reported to the user by the reporting part 24 for use as an index for predicting the risk of capsizing.

Figure 4:
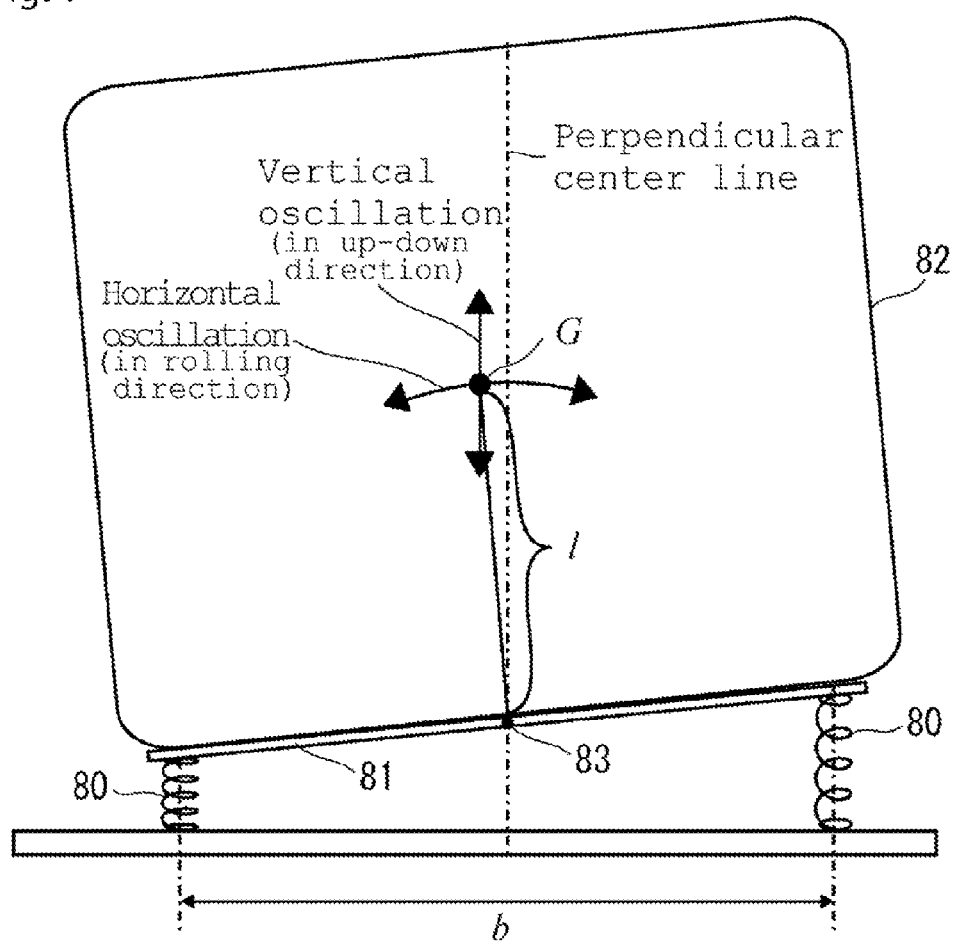
FIG. 4 is an explanatory drawing for explaining the 3-D center-of-gravity location detection theory to be applied to the embodiment of the capsize risk level calculation system in accordance with the present invention.

Next, with reference to FIG. 4 to FIG. 9, the operation of calculating a capsize risk level in the data processing apparatus 2 in the present embodiment will be explained in detail. Before explaining the operation of calculating a capsize risk level, let's consider a subject 82 on a spring structure 81 supported by a pair of springs 80 as shown in FIG. 4. If the subject 82 on the spring structure 81 is subjected to an external disturbance resulting from its movement, or an external force is directly applied thereto even during standstill, the subject 82 generates a vertical oscillation (a simple harmonic motion in an up-down direction) and a horizontal oscillation (in a rolling direction). The center axis for a horizontal oscillation (a rolling direction) is referred to as an oscillation center axis 83. This vertical oscillation and horizontal oscillation are determined depending upon the unique spatial center-of-gravity location provided for the subject 82, and therefore, by determining the simple harmonic motion frequency of vertical oscillation, "v'", and the rolling frequency of horizontal oscillation, "v", the center-of-gravity location on a three-dimensional space for the subject 82 from the oscillation center axis 83 can be determined (hereinbelow, this theory is referred to as the 3-D center-of-gravity detection theory) with no need for information about the weight and geometry of the subject 82. For example, if the subject 82 has a symmetrical geometry with respect to the oscillation center axis 83, the center-of-gravity height "l" from the oscillation center axis 83 to the center of gravity G of the subject 82 can be expressed by the following expression.

$$l^2 + \frac{g}{4\pi^2 v^2} l - \frac{b^2 v'^2}{4v^2} = 0 \qquad \text{[Math 1]}$$

Here, Math 1 is the same as Math 16, being given in Japanese Patent No. 4517107, which has been earlier applied by the present inventor and registered, except that the value of "α" is specified to be equal to 0°, and if the coefficient of the quadratic term, the coefficient of the linear term, and the constant; term are specified, the value of "l" can be determined. The symbol "π" denotes the circular constant, "g" the gravitational acceleration, and "b" the breadth between the pair of springs 80 in the spring structure 81.

In addition, according to the 3-D center-of-gravity detection theory, the lateral rollover limit height "$l_{max}$", which is a limit center-of-gravity height "l" beyond which the subject 82 placed on the spring structure 81 is rolled over, can be expressed by the following expression.

$$l_{max} = \frac{\pi^2 v'^2 b^2}{g} \qquad \text{[Math 2]}$$

Here, Math 2 is the same as Math 6, being given in Japanese Patent Application No. 2011-266708, which has been earlier applied by the present inventor, and if the simple harmonic motion frequency of vertical oscillation, "v'" and the breadth between the pair of springs 80, "b", are given, the lateral rollover limit height "$l_{max}$" can be determined.

Figure 5:
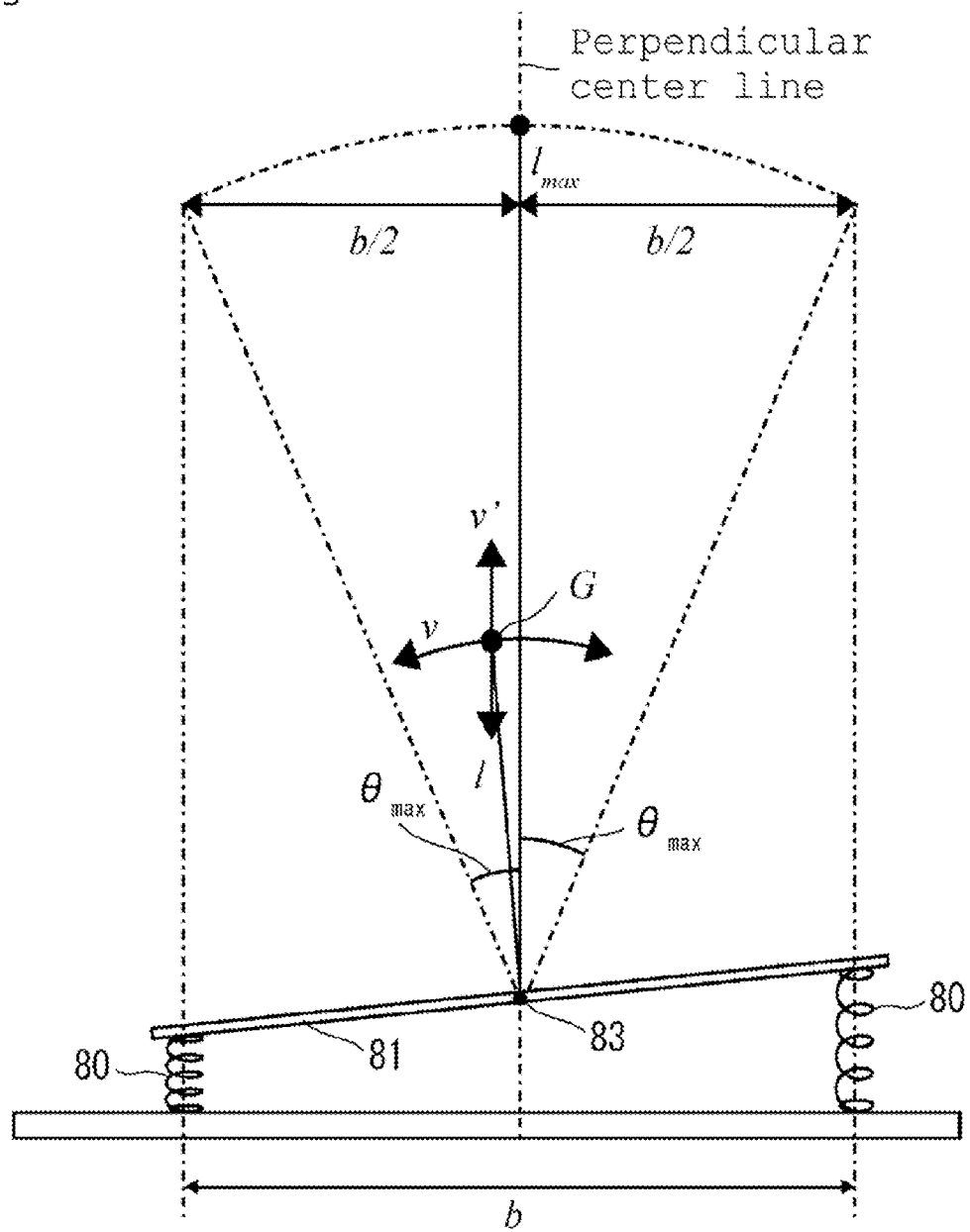
FIG. 5 is an explanatory drawing for explaining the 3-D center-of-gravity location detection theory to be applied to the embodiment of the capsize risk level calculation system in accordance with the present invention.

Further, as shown in FIG. 5, if the lateral rollover limit height "$l_{max}$" is moved around the oscillation center axis 83, and intersection points with the respective perpendicular lines on both sides of the breadth of the pair of springs 80, "b", are considered, the spring structure 81 itself does not exist in the region outside thereof, and therefore, any subject 82 cannot be at standstill (cannot exist) on the spring structure 81 independently of the lateral rollover limit height "$l_{max}$". Therefore, if this limit intersection point is formulated, it can be expressed by the following expression.

$$\frac{b}{2} = l_{max} \cdot \sin\theta_{max} \qquad \text{[Math 3]}$$

Here, the symbol "$\theta_{max}$" denotes the lateral rollover limit angle, which is an angle formed by a straight line connecting between the point at which the circular arc of the lateral rollover limit height "$l_{max}$" around the oscillation center axis 83 is intersected with the respective perpendicular lines on both sides of the breadth of the pair of springs 80, "b", and the oscillation center axis 83, and a perpendicular line on the oscillation center axis 83.

Next, application of the above-described 3-D center-of-gravity detection theory for use on land to the vessel 7 will be considered. As shown in FIG. 4, the 3-D center-of-gravity detection theory assumes the oscillation of the subject 82 on the spring structure 81 to be an oscillation around the oscillation center axis 83 for determining the center-of-gravity height "l" and the lateral rollover limit height "$l_{max}$". Therefore, also in the case where the 3-D center-of-gravity detection theory is applied to the vessel 7, it is required to establish the axis which provides the center of an oscillation of the vessel 7.

As shown in FIG. 6(*a*), a mass point floating on or in the surface of the water generates a circular motion resulting from the wave. The motion becomes smaller as the distance from the surface of the water is increased, and becomes standstill at a certain water depth. As shown in FIG. 6(*b*), as a matter of course, the vessel 7 is basically governed by such motion. Therefore, it can be considered that, with the vessel 7, the center of gravity G generates a vertical oscillation (a simple harmonic motion in an up-down direction) and a horizontal oscillation (in a rolling direction) around a specific axis location beneath the surface of the water. The axis location providing the center of such vertical oscillation and horizontal oscillation is a virtual lower center, not existing in a physically visible form, however, this virtual lower center can be considered as the oscillation center axis O of an oscillation of the vessel 7. Therefore, the length of a line segment connecting between the oscillation center axis O and the center of gravity G of the vessel 7 provides an oscillation radius "l" of the vessel 7 that corresponds to the center-of-gravity height "l" in the 3-D center-of-gravity detection theory for use on land. The oscillation center axis O for the center of gravity G is normally beneath the surface of the water, however, theoretically, depending upon the conditions of the vessel 7, it may be freely taken in such a location as that in the hull above the ship bottom, and that in the water or at the water bottom under the ship bottom.

In the 3-D center-of-gravity detection theory, the value of breadth between the pair of springs 80 supporting the spring structure 81, "b", is required in advance as illustrated in FIG. 4. For example, if the spring structure 81 is a train or an automobile, the value of breadth "b" is that of the breadth between the right and left axle bearing portions. However, in the case where the 3-D center-of-gravity detection theory is applied to the vessel 7, there exists no spring structure 81 itself, and thus the value of breadth "b" cannot be set in advance.

Figures 7A, 7B, 7C:
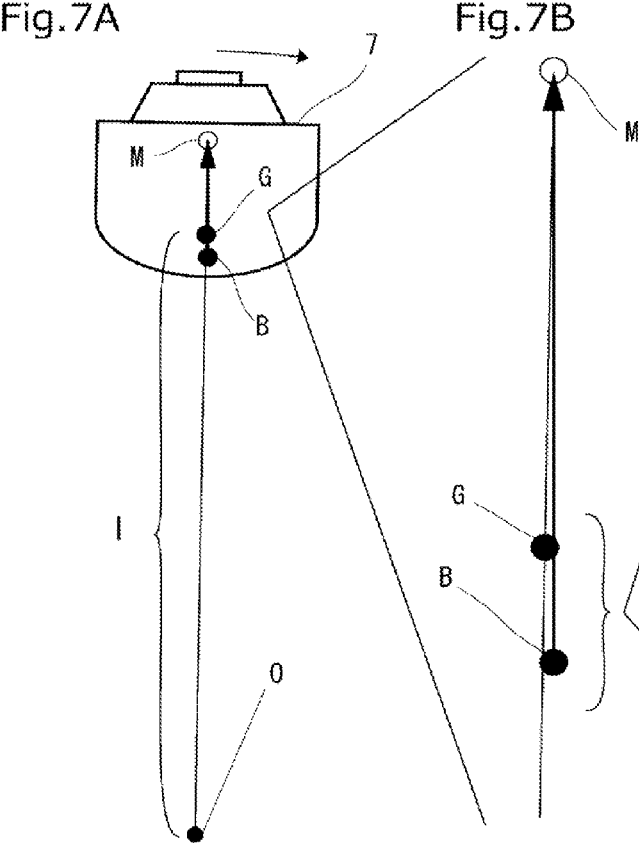
FIGS. 7(a), 7(b), and 7(c) are a drawing illustrating the instantaneous state in which the vessel is slightly inclined rightward.

Then, application of the relationship between the value of breadth "b" and the lateral rollover limit height "$l_{max}$" given in Math 3 to the vessel 7 is considered. First, the state in which the vessel 7 is inclined at a minute angle of horizontal oscillation inclination is considered. In FIGS. 7(a), 7(b), and 7(c), the instantaneous state in which the vessel 7 is slightly inclined rightward is illustrated on the basis of the 3-D center-of-gravity detection theory. The angle of horizontal oscillation inclination is minute, and thus as illustrated in FIG. 7(a), the metacenter M, the center of gravity G, and the oscillation center axis O can be considered to be on the same straight line, the straight line being inclined by the angle of horizontal oscillation inclination. FIG. 7(b) gives an enlarged illustration of the positional relationship among the metacenter M, the center of gravity G, and the buoyancy center B that is illustrated in FIG. 7(a). FIG. 7(c) gives an enlarged illustration of the positional relationship between the center of gravity G and the buoyancy center B that is illustrated in FIG. 7(b).

Referring to FIGS. 7(a), 7(b), and 7(c), it can be seen that, although the metacenter M and the center of gravity G are interlocked with the inclination of the hull, the buoyancy center B is always located on a perpendicular line down from the metacenter M independently of the inclination of the hull. In other words, the intersection point between the perpendicular line passing through the buoyancy center B and the perpendicular line passing through the center of gravity G when the vessel 7 is not inclined provides the metacenter M. Therefore, when the vessel 7 is inclined, there is produced a separation between the straight line passing through the metacenter M and the center of gravity G and the perpendicular line passing through the buoyancy center B. If, in the state where the vessel 7 is inclined, a horizontal line is drawn from the center of gravity G to the perpendicular line passing through the buoyancy center B, and the intersection point is named Z, the magnitude of the separation is expressed as GZ, providing a source of restoring force of the vessel 7 (which is the principle of leverage for restoring).

As shown in FIGS. 7(a), 7(b), and 7(c), the separation GZ is produced with the four elements of the metacenter M, the center of gravity G, the buoyancy center B, and the oscillation center axis O being interlocked with one another. In FIGS. 7(a), 7(b), and 7(c), there is given an example of assumed state in which the vessel 7 has been inclined at a minute angle of horizontal oscillation inclination, however, if the vessel 7 is exposed to a greater external disturbance in a stormy weather, or the like, the angle of horizontal oscillation inclination of the vessel 7 is increased, resulting in a large inclination. FIGS. 8(a), 8(b), and 8(c) illustrate the relationship among the metacenter M, the center of gravity G, the buoyancy center B, the oscillation center axis O, and the separation GZ in the event where the vessel is led to such a great inclination. FIG. 8(a) shows the state in which the vessel 7 is at an angle of 0° of horizontal oscillation inclination; FIG. 8(b) shows the state in which the vessel 7 is inclined at an angle of horizontal oscillation inclination, "θ"; and FIG. 8(c) shows the state in which the vessel 7 is further inclined at an angle of horizontal oscillation inclination, "$θ_{max}$".

For an oscillation of the vessel 7 on the surface of the water, it is assumed that there are the oscillation center axis O as a lower center beneath the center of gravity G; the metacenter M as an upper center thereabove; and the buoyancy center B perpendicularly beneath the metacenter M, and the center of gravity G and these three elements are interlocked with one another, resulting in the angle of horizontal oscillation inclination, "θ", being subjected to a change. Since the buoyancy always acts on the vessel 7, which is floating on the surface of the water, the location of the center of gravity G can move only in parallel with the surface of the water, even if the vessel 7 is inclined. Contrarily to this, if the inclination of the hull is increased, the metacenter M, which is a theoretical existence, decreases its height while tracing a circular arc locus. Therefore, as shown in FIG. 8(b), as the vessel 7 is inclined, the separation GZ is increased, however, the location of the metacenter M shown in FIG. 8(b) (an intersection point of the perpendicular line passing through the buoyancy center B) is no longer the initial location of the metacenter M shown in FIG. 8(a), but at the intersection point between the locus of the circular arc traced by the metacenter M and a straight line extending from the oscillation center axis O and passing through the center of gravity G. If the inclination of the hull is further increased from the state shown in FIG. 8(b), the distance between the center of gravity G and the locus of the circular arc traced by the metacenter M is decreased, resulting in the separation GZ being reduced in due course. And finally, as shown in FIG. 8(c), the locus of the circular arc traced by the metacenter M reaches the center of gravity G, with the length of a line segment connecting between the metacenter M and the center of gravity G, GM, as well as the separation GZ becoming zeroed. The angle of horizontal oscillation inclination, "$θ_{max}$" of the vessel 7 that is given in FIG. 8(c) provides the boundary between capsizing and ng, and the restoring region in which the angle of horizontal oscillation inclination of the vessel 7 is smaller than "$θ_{max}$" and the capsize region in which the angle of horizontal oscillation inclination of the vessel 7 is greater than "$θ_{max}$" are defined.

Here, it can be seen that the angle of horizontal oscillation inclination, "$θ_{max}$" given in FIGS. 8(a), 8(b) and 8(c), and the lateral rollover limit angle "$θ_{max}$" shown in FIG. 5 are both angles which indicate the boundary between overturning and restoring, and the length of a line segment connecting between the metacenter M and the oscillation center axis O corresponds to the lateral rollover limit height "$l_{max}$" in the 3-D center-of-gravity detection theory for use on land. Hereinbelow, the length of a line segment connecting between the metacenter M and the oscillation center axis O is referred to as the capsize limit oscillation radius "$l_{max}$". Further, the breadth of the restoring region shown in FIGS. 8(a), 8(b), and 8(c), in other words, the breadth between the perpendicular line passing through the center of gravity G in the vessel 7 which is not inclined, shown in FIG. 8(a), and the perpendicular line passing through the center of gravity G in the vessel 7 which has been inclined to the boundary between capsizing and restoring, shown in FIG. 8(c), can be considered as ½ of the breadth between the pair of springs 80, "b", given in FIG. 5.

Therefore, the relationship among the oscillation radius "l", the capsize limit oscillation radius "$l_{max}$", and the breadth "b" can be expressed by the following expression.

$$\left(\frac{b}{2}\right)^2 = (l_{max})^2 - l^2 \qquad \text{[Math 4]}$$

Here, the above-mentioned Math 1, Math 2, and Math 4 are formulated into simultaneous equations, which are expressed as follows:

$$\begin{cases} l^2 + \dfrac{g}{4\pi^2 v^2} l - \dfrac{b^2 v'^2}{4v^2} = 0 \\ \left(\dfrac{b}{2}\right)^2 = (l_{max})^2 - l^2 \\ l_{max} = \dfrac{\pi^2 v'^2 b^2}{g} \end{cases} \quad [\text{Math 5}]$$

In the simultaneous equations of Math 5, the simple harmonic motion frequency of vertical oscillation, "v'", and the rolling frequency of horizontal oscillation, "v", are calculated on the basis of the outputs of the acceleration sensor 4 and the angular velocity sensor 5. In other words, a reciprocating motion in an up-down direction of the vessel 7 that is detected by the acceleration sensor 4 is rendered into an oscillation of the oscillation center axis O in an up-down direction (a simple harmonic motion frequency "v'"). In addition, a simple pendulum motion in a rolling direction around the center axis of the vessel 7 that is detected by the angular velocity sensor 5 is rendered into a simple pendulum motion around the oscillation center axis O (a rolling frequency "v").

Therefore, in the simultaneous equations of Math 5, the unknown quantities are three, i.e., the oscillation radius "l", the capsize limit oscillation radius "$l_{max}$", and the breadth "b". Therefore, with the three equations of Math 5, the unknown quantities, i.e., the oscillation radius "l", the capsize limit oscillation radius "$l_{max}$" and the breadth "b" can be found. In other words, in the case where the 3-D center-of-gravity detection theory is applied to the vessel 7 floating on the surface of the water, the oscillation radius "l" and the capsize limit oscillation radius "$l_{max}$" can be determined from the simple harmonic motion frequency of vertical oscillation, "v'", and the rolling frequency of horizontal oscillation, "v", with no need for setting, in advance, the value corresponding to the breadth of the pair of springs 80, "b", given in FIG. 5 in the 3-D center-of-gravity detection theory for use on land.

Next, the capsize limit condition for the vessel 7 will be derived. As shown in FIGS. 8(a), 8(b), and 8(c), when the vessel 7 is inclined, and the length of a line segment connecting between the metacenter M and the center of gravity G, GM, is zeroed, the restoring force is lost, resulting in the vessel 7 being capsized. Further, as described above, since the length of a line segment connecting between the metacenter M and the oscillation center axis O is the capsize limit oscillation radius "$l_{max}$", and the length of a line segment connecting between the center of gravity G and the oscillation center axis O is the oscillation radius "l", the conditional expression for capsize limit can be given as follows:

$$GM = l_{max} - l > 0 \quad [\text{Math 6}]$$

The conditional expression of Math 6 represents only the condition to be met when the vessel 7 is at standstill without generating any oscillation (rolling) in a horizontal direction. Since the vessel 7 is always subjected to wind and waves on the surface of the water, it certainly generates a rolling motion in a horizontal direction, and therefore, a capsize limit maximum rolling angle must be indicated. As shown in FIGS. 8(a), 8(b), and 8(c), even if the vessel 7 is inclined in a rolling direction, the location of the center of gravity G in an up-down direction with respect to the oscillation center axis O is unchanged, however, the height of the metacenter M in an up-down direction with respect to the oscillation center axis O, which is distant from the oscillation center axis O by the capsize limit oscillation radius "$l_{max}$" is lowered with the angle of horizontal oscillation inclination, "θ", of the vessel 7 being increased. Therefore, if the angle of horizontal oscillation inclination, "θ", meets the condition given by the following expression, it is expected that the vessel 7 will be capsized.

$$l_{max} \cdot \cos\theta \leq l \quad [\text{Math 7}]$$

Therefore, the angle of horizontal oscillation limit inclination, "$\theta_{max}$" for the vessel 7 not to be capsized by wind and waves even during oscillation (hereinbelow, to be referred to as the angle of capsize limit inclination, "$\theta_{max}$") can be expressed as follows by using the capsize limit oscillation radius "$l_{max}$" and the oscillation radius "l".

$$\cos\theta_{max} = \dfrac{l}{l_{max}} \quad [\text{Math 8}]$$

From Math 8, the angle of horizontal oscillation inclination, "θ", for the vessel 7 not to be capsized by wind and waves even during oscillation must meet the following expression.

$$\theta \leq \theta_{max} = \cos^{-1} \dfrac{l}{l_{max}} \quad [\text{Math 9}]$$

The condition of Math 7 becomes equivalent to that of Math 6 in the state in which the vessel 7 is at standstill (θ=0) with no oscillation (rolling motion) being generated in the horizontal direction, and therefore provides a necessary and sufficient condition for the vessel 7 not to be capsized.

Therefore, the arithmetic part 21 of the data processing apparatus 2 first calculates a simple harmonic motion frequency of vertical oscillation, "v'", and a rolling frequency of horizontal oscillation, "v", on the basis of the outputs from the acceleration sensor 4 and the angular velocity sensor 5 stored in the storage part 22; then, uses the above-mentioned Math 5 to calculate a capsize limit oscillation radius "$l_{max}$" and an oscillation radius "l"; and finally uses the above-mentioned Math 9 to calculate an angle of capsize limit inclination, "$\theta_{max}$" as a capsize risk level. The angle of capsize limit inclination, "$\theta_{max}$", which has been calculated by the arithmetic part 21 is reported to the user by means of the reporting part 24, such as a liquid crystal display and a speaker, for use as an index for predicting the risk of capsizing of the vessel 7. There may be provided a configuration which reports a capsize risk level calculated from the capsize limit oscillation radius "$l_{max}$" and the oscillation radius "l", which have been obtained in the course of operation of the arithmetic part 21. Further, there may be provided a configuration in which, on the basis of the output from the angular velocity sensor 5, the current angle of horizontal oscillation inclination, "θ", of the vessel 7 is detected, and the result of comparison between the angle of horizontal oscillation inclination, "θ", which has been detected and the angle of capsize limit inclination, "$\theta_{max}$", is reported as a capsize risk level. In this case, there may be provided a configuration in which, when the angle of horizontal oscillation inclination, "θ", approaches the angle of capsize limit inclination, "$\theta_{max}$", an alarm is issued.

Next, the relationship between the angle of capsize limit inclination, "$\theta_{max}$", which is calculated by the arithmetic part 21 in the data processing apparatus 2, and the wave height is considered. There are several factors which cause the vessel 7 to incline, however, the predominant factor for any vessels 7 is waves which are encountered at sea. Especially on the surface of the sea, wind and waves are folded over one another to make a wave height, thereby the appearance of a sea wave providing a complex phenomenon. Then, it is reasonable to take the most typical offshore wave, which has a sufficient depth of water, as an example, and to use the significant wave height.

The significant wave height is defined as an average of the wave heights which occupy one third of all the wave heights that is counted from the maximum wave height obtained when various wave heights which can be observed at sea in a definite period of time are arranged in the order from lowest to highest. Thus, it is empirically known that the instantaneous maximum wave height may extremely rarely reach a height as high as approx. 1.6 times the significant wave height "h". From such a relationship, it is a general practice in the fields of shipbuilding and navigation that the significant wave height "h" is used as a criterion which can influence the stability of the hull or the risk of capsizing.

Figure 9:
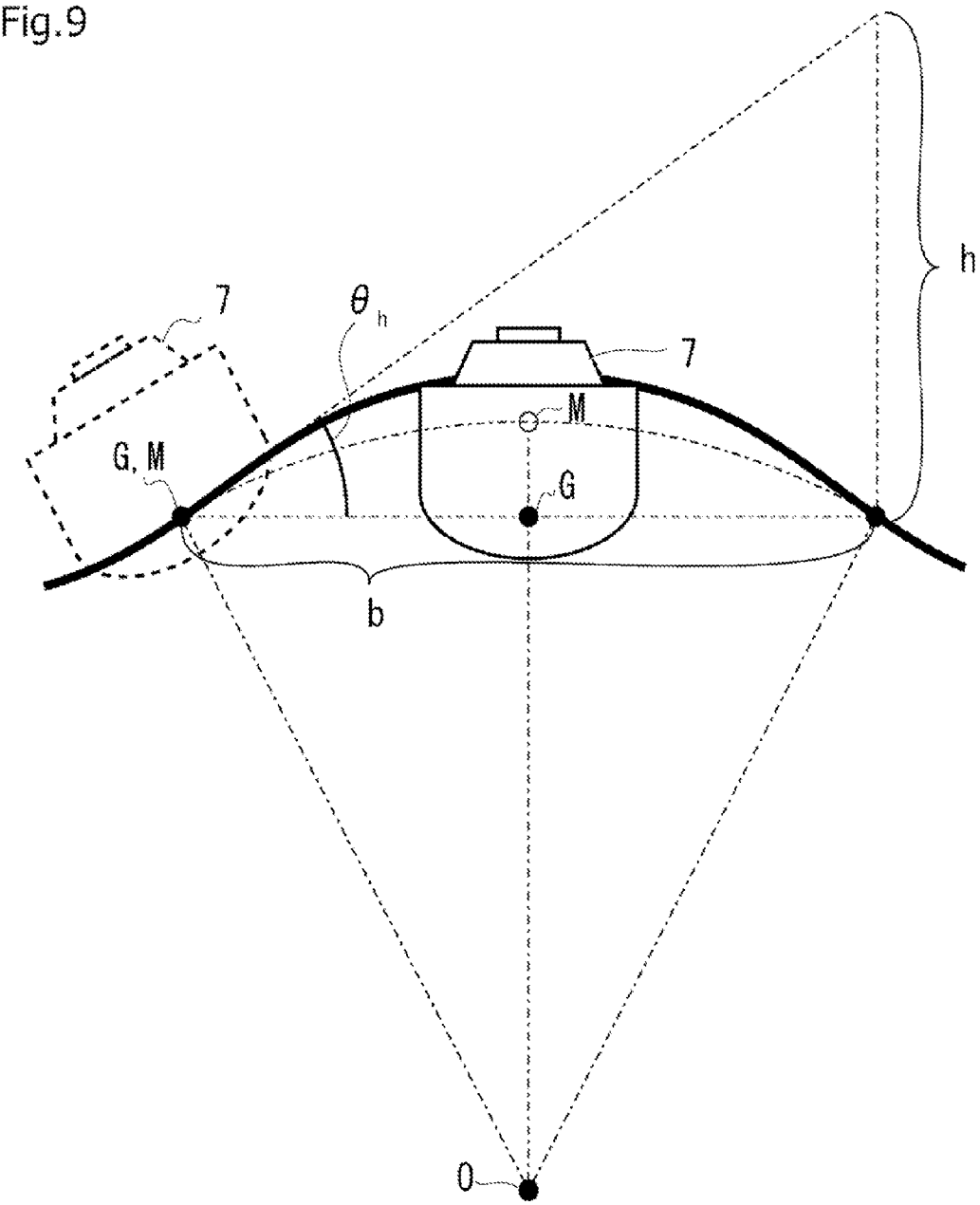
FIG. 9 is an explanatory drawing for explaining the relationship between the wave height and the inclination of the hull.

On the basis of the concept of significant wave height, the offshore wave at sea can be said to provide a phenomenon in which waves having not only various wave heights but also a variety of wavelengths are folded over one another. Therefore, not only the wave height but also the wavelength which can have an effect on the inclination of the hull 7 must be taken into account. Considering the capsize risk level in association with this technique, the most hazardous situation (the situation in which the hull 7 is most easily inclined) is a situation in which, as shown in FIG. 9, the wavelength for the wave height "h" becomes equal to the breadth "b" which is calculated using Math 5. FIG. 9 illustrates, as an image, the situation in which the wavefront of such a wavelength reaches the angle of a tangent with respect to a circle drawn by the capsize limit oscillation radius "$l_{max}$" in the location where the capsize limit oscillation radius "$l_{max}$" minus oscillation radius "l" is equal to 0 in FIGS. 8(a), 8(b), and 8(c). The angle of horizontal oscillation inclination, "$\theta_h$," of the vessel 7 at this time can be defined as follows, using the breadth "b", which is calculated with Math 5, and the wave height "h".

$$\theta_h = \tan^{-1}\frac{h}{b} \quad \text{[Math 10]}$$

Therefore, the condition of the wave height "h" for the vessel 7 not to be capsized by wind and waves even during oscillation can be expressed as follows, using the angle of capsize limit inclination, "$\theta_{max}$".

$$\tan^{-1}\frac{h}{b} \le \theta_{max} \quad \text{[Math 11]}$$

Thus, from the angle of capsize limit inclination, "$\theta_{max}$", the arithmetic part 21 of the data processing apparatus 2 may calculate and output a maximum wave height "h" at which the vessel 7 will not be capsized by wind and waves even during oscillation, and there may be provided a configuration in which, by inputting the maximum wave height "h", the result of comparison between the angle of inclination, "$\theta_h$" for the maximum inputted wave height "h" and the angle of capsize limit inclination, "$\theta_{max}$", is reported as a capsize risk level.

As described above, on the basis of the concept of significant wave height, waves having various wave heights and wavelengths are folded over one another at sea, and thus it is proper to consider the condition suggested in FIG. 9 as an effective criterion of the capsize limit for the vessel 7 at sea. In addition, from the definition of significant wave height, it can be the that there is the possibility that a wave height as large as 1.6 times the supposition value of significant wave height may appear, even if the frequency of appearance is extremely low; therefore if the significant wave height is to be applied to the criterion concerned, it should be noted that the criterion is a minimum required one as that of the capsize limit for the vessel 7, and to enhance the safety, it is recommended that the wave height as high as 1.6 times the significant wave height be used as the criterion.

Capsize Risk Level Calculation Example 1

FIG. 10 gives an example in which the capsize risk level calculation system of the present embodiment was mounted to a vessel A, B for calculating a capsize risk level. The hull information about the vessel A, B is known, and on the basis of such hull information and the existing naval architecture, the value of GM (the length of a line segment connecting between the metacenter M and the center of gravity G) has been determined.

As a result of that the capsize risk level calculation system of the present embodiment was mounted to the vessel A with a value of GM of 1.75 m for calculating a capsize risk level, it was found that the value of the capsize limit oscillation radius "$l_{max}$" minus the oscillation radius "l" that corresponds to the value of GM of 1.75 m is 1.8 m. Further, the angle of capsize limit inclination, "$\theta_{max}$", was found to be 52.9°, which indicates that the vessel A is sufficiently safe. Further, the wave height "h" at which the angle of capsize limit inclination, "$\theta_{max}$", substantially coincides with the angle of horizontal oscillation inclination, "$\theta_h$", was found to be 9.6 m, thereby the vessel A being considered to run the risk of capsizing at a wave height "h" of approx. 10 m.

As a result of that the capsize risk level calculation system of the present embodiment was mounted to the vessel B with a value of GM of 1.36 m for calculating a capsize risk level, it was found that the value of the capsize limit oscillation radius "$l_{max}$" minus the oscillation radius "l" that corresponds to the value of GM of 1.36 m is 1.22 m. Further, the angle of capsize limit inclination, "$\theta_{max}$", was found to be 40.9°, which indicates that the vessel B is sufficiently safe. Further, the wave height "h" at which the angle of capsize limit inclination, "$\theta_{max}$" substantially coincides with the angle of horizontal oscillation inclination, "$\theta_h$", was found to be 5.7 m, thereby the vessel B being considered to run the risk of capsizing at a wave height "h" of approx. 6 m.

Capsize Risk Level Calculation Example 2

Figure 11A:
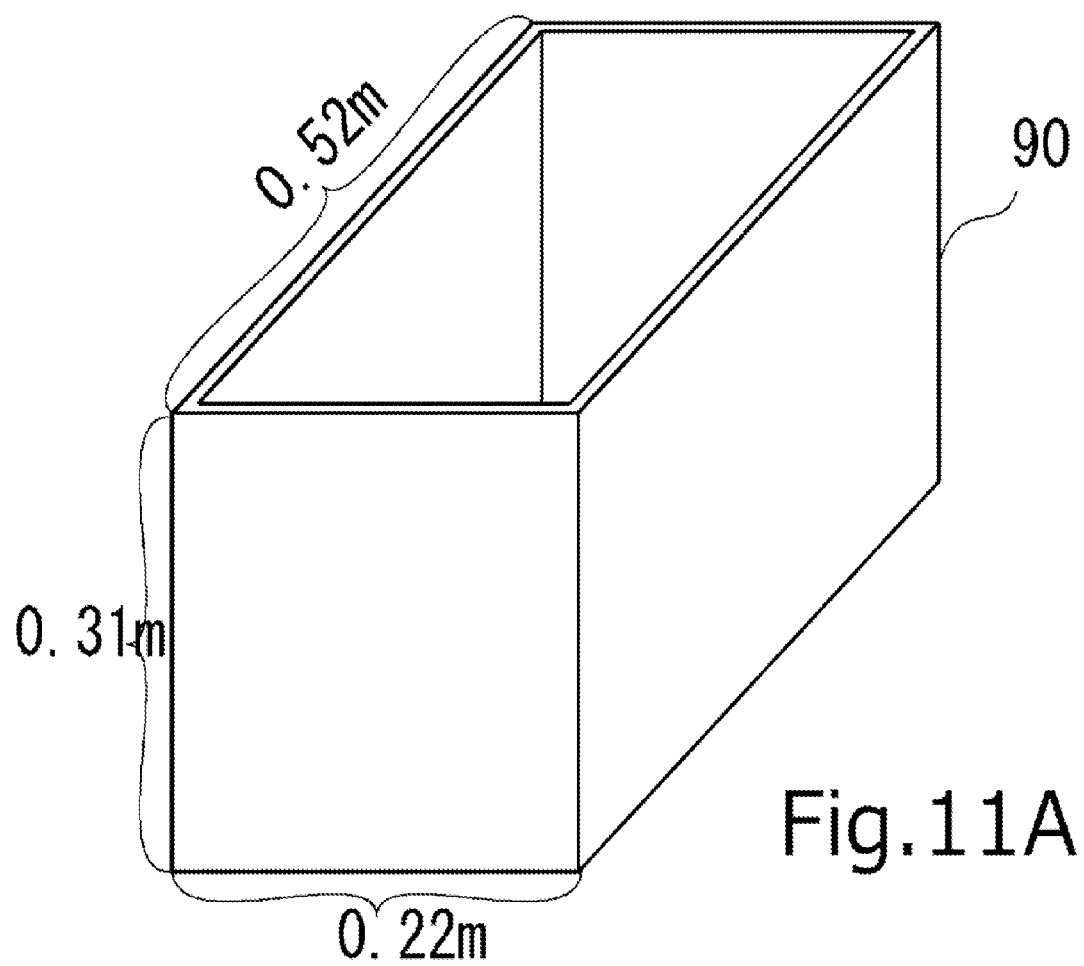

A model ship 90 with a rectangular shape and a ship width of 0.22 m as shown in FIG. 11(a) was floated on the surface of the sea, and the capsize risk level calculation system of the present embodiment was mounted to the model ship 90 for calculating a capsize risk level. In order to stably float the model ship 90 on the surface of the water, a weight 91 was disposed at the ship bottom in a central part thereof in the lateral direction as shown in FIG. 11(b). And, by sequentially inserting light-weight pedestals (not shown) with a negligible weight under the weight 91, the center-of-gravity height from the ship bottom to the center-of-gravity G of the weight was changed, and for the respective center-of-gravity heights, the capsize risk level was calculated, FIG. 12 giving the results of calculation. FIG. 13 is a scatter diagram in which the values of "$\theta_{max}$" which are given in FIG. 12 as the results of calculation are represented by the axis of ordinate and the center-of-gravity heights by the axis of abscissa.

Referring to FIG. 13, it can be seen that the angle of capsize limit inclination, "$\theta_{max}$", for the model ship 90 is decreased substantially in a quadratic curve shape with the center-of-gravity height being increased, and an extension line based on such a trend substantially coincides with the center-of-gravity height at which the model ship 90 has been capsized. Therefore, it can be supposed that the angle of capsize limit inclination, "$\theta_{max}$", which was calculated by the capsize risk level calculation system of the present embodiment, represents a capsize risk level in accordance with the center-of-gravity height for the model ship 90.

Further, referring to FIG. 12, it can be seen that, if the wave height "h" is assumed to be 0.6 m, the value of ("$\theta_{max}$"–"$\theta_h$") becomes negative at an angle of capsize limit inclination, "$\theta_{max}$", of under 37.9, causing a capsize. This indicates that, in the case where the center-of-gravity height from the ship bottom of the model ship 90 is further increased, this model ship will be capsized also at an angle of capsize limit inclination, "$\theta_{max}$" of 30° or under, which coincides with the trend of the quadratic curve shown in FIG. 13.

In the present embodiment, the oscillation detection part 1 and the data processing apparatus 2 are configured to be connected with a cable for service, however, the oscillation detection part 1 and the data processing apparatus 2 may be configured to be connected by radio. In this case, the oscillation detection part 1 and the data processing apparatus 2 need not be installed as an integral part, and a part of or all of the functions of the data processing apparatus 2 may be separated from the oscillation detection part 1 to be installed on land, for example.

As described above, the present embodiment includes the acceleration sensor 4 for detecting a reciprocating motion in an up-down direction of the vessel 7 as an oscillation in an up-down direction of the virtual oscillation center axis O; the angular velocity sensor 5 for detecting a simple pendulum motion in a rolling direction around the center axis of the vessel 7 as a simple pendulum motion of the center of gravity G around the oscillation center axis O of the vessel 7; and the arithmetic part 21 for calculating a capsize risk level from an oscillation radius "l" connecting between the oscillation center axis O and the center of gravity G of the vessel 7, and a capsize limit oscillation radius "$l_{max}$" connecting between the oscillation center axis O and the metacenter M of the vessel 7, which are obtained on the basis of the results of detection by the acceleration sensor 4 and the angular velocity sensor 5. With this configuration, on the basis of the reciprocating motion in an up-down direction of the vessel, and a simple pendulum motion in a rolling direction around the center axis of the vessel, the value of GM, which provides an index of the risk of capsizing, can be calculated. Further, for this calculation, there is no need for using the hull information, whereby the value of GM, which varies depending upon the peripheral environment of the vessel 7 or the state of the vessel 7 can be calculated in real time.

Further, according to the present embodiment, the arithmetic part 21 is configured such that the angle of capsize limit inclination, "$\theta_{max}$", on the basis of the oscillation radius "l" and the capsize limit oscillation radius "$l_{max}$" is calculated as a capsize risk level. With this configuration, there is provided an advantage that, on the basis of the reciprocating motion in an up-down direction of the vessel, and a simple pendulum motion in a rolling direction around the center axis of the vessel, the angle of capsize limit inclination, "$\theta_{max}$", which provides an index of the risk of capsizing, can be calculated with no use of a piece of hull information.

It is obvious that the present invention is not limited to the above-mentioned embodiment, and within the technical scope of the present invention, the above-mentioned embodiment may be altered as appropriate. In addition, the number, location, geometry, and the like, of the above-mentioned component members are not limited to those as given in the above-mentioned embodiment, and may be altered into a number, location, geometry, and the like, which are suited for implementing the present invention. In each figure, the same component is provided with the same reference sign.

DESCRIPTION OF SYMBOLS

The symbol 1 denotes an oscillation detection part; 2 a data processing apparatus; 3 a reference board; 4 an acceleration sensor; 5 an angular velocity sensor; 6 an A-D converter; 7 a vessel; 21 an arithmetic part; 22 a storage part; 23 an operation part; 24 a reporting part; 25 a reception part; 26 a bus; 31 a mounting hole; 32 a Y-axis line; 33 an X-axis line; 80 a spring; 81 a spring structure; 82 a subject; and 83 an oscillation center axis.

The invention claimed is:

1. A capsize risk level calculation system comprising:
   an up-down direction detection means for detecting a reciprocating motion in an up-down direction of a vessel as an oscillation in an up-down direction of a virtual oscillation center axis,
   a rolling direction detection means for detecting a simple pendulum motion in a rolling direction around the center axis of said vessel as a simple pendulum motion of the center of gravity of said vessel around said oscillation center axis, and
   a calculation means for calculating a capsize risk level on the basis of the results of detection by said up-down direction detection means and said rolling direction detection means, said calculation means calculating,
      a simple harmonic motion frequency of the reciprocating motion on the basis of the results of detection by said up-down direction detection means,
      calculating a rolling frequency of the simple pendulum motion on the basis of the results of detection by said rolling direction detection means, and
      calculating an oscillation radius connecting between said oscillation center axis and the center of gravity of said vessel, and a capsize limit oscillation radius connecting between said oscillation center axis and the metacenter of said vessel as said capsize risk level on the basis of the simple harmonic motion frequency and the rolling frequency, wherein
   said oscillation center axis is the lower center of said vessel, being set as a point around which a vertical oscillation and a horizontal oscillation of said vessel floating on the surface of the water are generated.

2. The capsize risk level calculation system according to claim 1, wherein said calculation means calculates a capsize limit inclination angle on the basis of said oscillation radius and said capsize limit oscillation radius as said capsize risk level.

3. The capsize risk level calculation system according to claim 1, wherein said metacenter is the upper center of said vessel, being the intersection point between the perpendicular line passing through the buoyancy center and the perpendicular line passing through the center of gravity when said vessel is not inclined.

* * * * *